(12) United States Patent
Hochhalter et al.

(10) Patent No.: US 7,939,979 B2
(45) Date of Patent: *May 10, 2011

(54) ELECTRIC ACTUATOR

(75) Inventors: Keith Hochhalter, Minnetrista, MN (US); Derek Wise, New Brighton, MN (US); Paul B. Gladen, Golden Valley, MN (US)

(73) Assignee: Tol-O-Matic, Inc., Hamel, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/455,390

(22) Filed: Jun. 1, 2009

(65) Prior Publication Data
US 2009/0261671 A1 Oct. 22, 2009

Related U.S. Application Data

(63) Continuation of application No. 11/031,539, filed on Jan. 7, 2005, now Pat. No. 7,541,707.

(60) Provisional application No. 60/535,362, filed on Jan. 8, 2004, provisional application No. 60/537,790, filed on Jan. 20, 2004.

(51) Int. Cl.
*H02K 7/06* (2006.01)
(52) U.S. Cl. ......................................... 310/80; 74/89.34
(58) Field of Classification Search ............... 310/80, 310/90, 68 B, 156.47; 74/89.33, 89.34, 89.41
See application file for complete search history.

(56) References Cited

U.S. PATENT DOCUMENTS

| | | |
|---|---|---|
| 3,815,435 A | 6/1974 | Eschenbacher et al. |
| 3,851,541 A | 12/1974 | Ploss et al. |
| 3,969,807 A | 7/1976 | Takizawa et al. |
| 4,040,445 A | 8/1977 | McCormick |
| 4,072,063 A | 2/1978 | Nauman |
| 4,198,872 A | 4/1980 | Metz |
| 4,250,762 A | 2/1981 | Weatherby |
| 4,266,437 A | 5/1981 | Obergfell |
| 4,286,793 A | 9/1981 | Ploss et al. |
| 4,369,011 A | 1/1983 | Ploss |
| 4,393,319 A | 7/1983 | Bock |
| 4,438,662 A | 3/1984 | Walton et al. |
| 4,489,248 A | 12/1984 | Petersen |
| 4,496,865 A | 1/1985 | Allen et al. |
| 4,521,707 A | 6/1985 | Baker |
| 4,614,128 A | 9/1986 | Fickler |
| 4,643,710 A | 2/1987 | Troutner |
| 4,664,136 A | 5/1987 | Everett |
| 4,841,186 A * | 6/1989 | Feigel et al. ............. 310/156.12 |
| 4,860,638 A | 8/1989 | Hosono et al. |
| 4,987,822 A | 1/1991 | Stoll |
| 4,988,905 A * | 1/1991 | Tolmie, Jr. ............... 310/68 B |
| 5,053,685 A | 10/1991 | Bacchi |
| 5,087,845 A | 2/1992 | Behrens et al. |
| 5,099,161 A | 3/1992 | Wolfbauer, III |
| 5,121,042 A | 6/1992 | Ako |
| 5,130,585 A | 7/1992 | Iwamatsu et al. |
| 5,142,172 A | 8/1992 | Horikoshi et al. |
| 5,234,386 A | 8/1993 | Nagai et al. |
| 5,334,897 A | 8/1994 | Ineson et al. |
| 5,363,741 A | 11/1994 | Takada et al. |
| 5,445,045 A | 8/1995 | Nagai et al. |

(Continued)

*Primary Examiner* — Dang D Le
(74) *Attorney, Agent, or Firm* — Dorsey & Whitney LLP

(57) ABSTRACT

An electrically powered linear actuator having a thrust assembly, a motor with a rotor surrounding at least a portion of the thrust assembly and a rotary encoder with a rotation sensing member rotatable with the rotor.

18 Claims, 12 Drawing Sheets

U.S. PATENT DOCUMENTS

| | | |
|---|---|---|
| 5,491,372 A | 2/1996 | Erhart |
| 5,499,547 A | 3/1996 | Nagai et al. |
| 5,557,154 A | 9/1996 | Erhart |
| 5,606,902 A | 3/1997 | Hosono et al. |
| 5,614,778 A | 3/1997 | Terao et al. |
| 5,617,772 A | 4/1997 | Hosono et al. |
| 5,637,940 A | 6/1997 | Nagai et al. |
| 5,676,016 A | 10/1997 | Nagai et al. |
| 5,685,390 A | 11/1997 | Chikuma et al. |
| 5,689,994 A | 11/1997 | Nagai et al. |
| 5,747,896 A | 5/1998 | Nagai et al. |
| 5,761,960 A | 6/1998 | Nagai et al. |
| 5,784,922 A | 7/1998 | Ozaki et al. |
| 5,796,187 A | 8/1998 | Nagai et al. |
| 5,799,543 A | 9/1998 | Nagai et al. |
| 5,809,831 A | 9/1998 | Nagai et al. |
| 5,884,549 A | 3/1999 | Hosono et al. |
| 5,912,520 A | 6/1999 | Kobayashi et al. |
| 5,966,988 A | 10/1999 | Aiso et al. |
| 6,000,292 A | 12/1999 | Nagai et al. |
| 6,003,428 A | 12/1999 | Mundie et al. |
| 6,067,868 A | 5/2000 | Nakamura et al. |
| 6,081,051 A | 6/2000 | Kitazawa et al. |
| 6,145,395 A | 11/2000 | Swanson et al. |
| 6,177,743 B1 | 1/2001 | Hartramph et al. |
| 6,186,770 B1 | 2/2001 | Ziv-Av |
| 6,223,971 B1 | 5/2001 | Sato |
| 6,278,077 B1 | 8/2001 | Cecil |
| 6,357,100 B2 | 3/2002 | Speller et al. |
| 6,362,547 B1 | 3/2002 | Peterson et al. |
| 6,531,798 B1 | 3/2003 | Palmero |
| 6,603,228 B1 | 8/2003 | Sato |
| 6,718,837 B2 | 4/2004 | Sato et al. |
| 6,756,707 B2 | 6/2004 | Hochhalter |
| 7,245,054 B1 * | 7/2007 | Walls et al. ............... 310/156.25 |
| 7,541,707 B2 * | 6/2009 | Hochhalter et al. ............ 310/80 |
| 2004/0120615 A1 | 6/2004 | Chase |

* cited by examiner

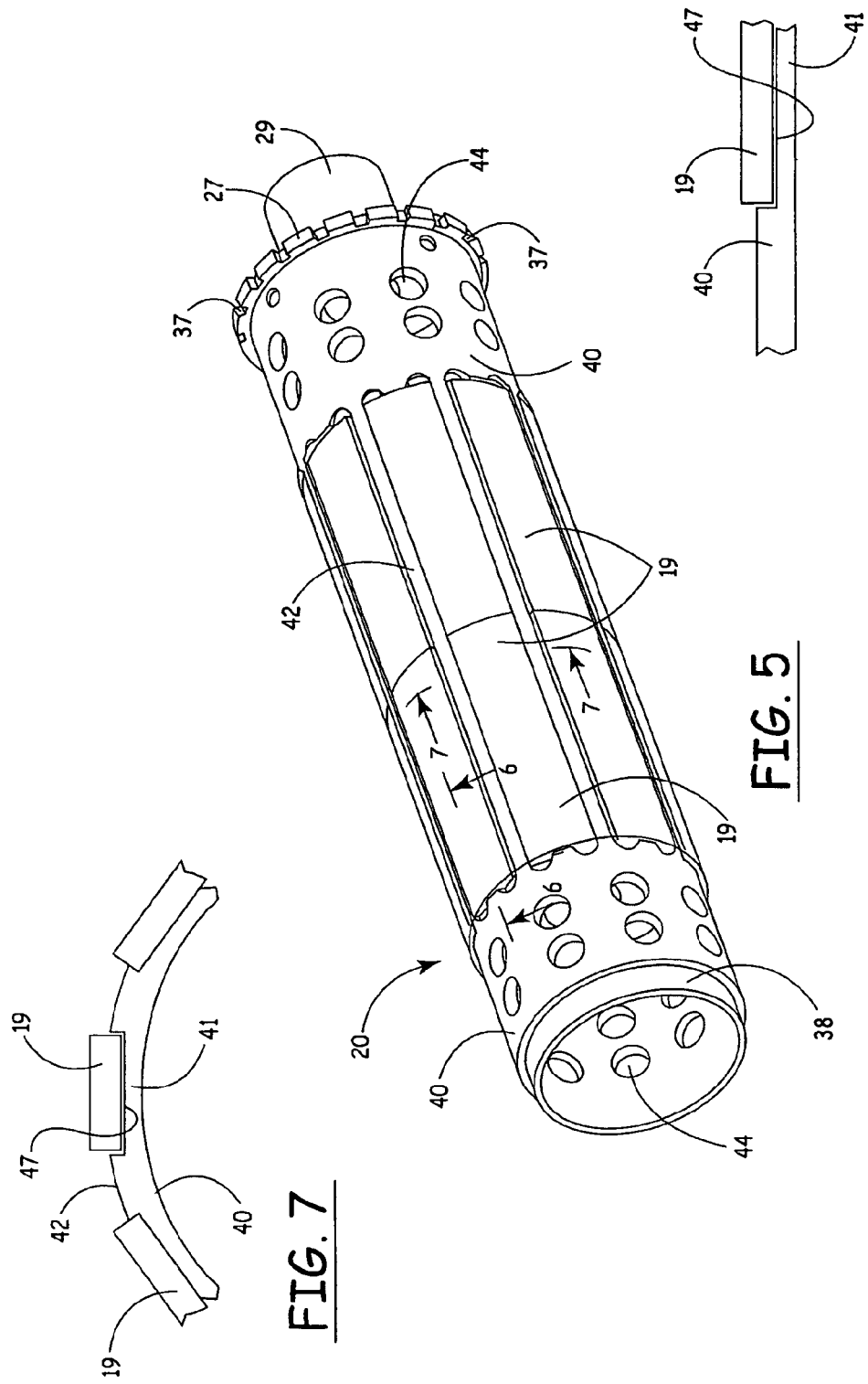

ELECTRIC ACTUATOR

CROSS-REFERENCE TO RELATED APPLICATION(S)

This application is a Continuation of U.S. patent application Ser. No. 11/031,539, filed Jan. 7, 2005, now U.S. Pat. No. 7,541,707 entitled "Electric Actuator," which claims the benefit of and priority to U.S. provisional patent application No. 60/535,362, filed Jan. 8, 2004 and also claims the benefit of and priority to U.S. provisional patent application No. 60/537,790, filed Jan. 20, 2004. Each of the above-identified patent applications is incorporated by reference herein in its entirety.

BACKGROUND OF THE INVENTION

1. Field of the Art

The present invention relates generally to an electrically powered linear actuator and more particularly to an electrically powered actuator adapted for a variety of robotic or other applications. The invention has particular application to the control of robotic, pedestal or fixture welding guns and specifically, welding guns such as those utilized in the automotive industry, to the injection molding field or other applications requiring a short stroke, to the actuation of clamping fixtures and the like in various industries such as the automotive industry and to the linear movement of various apparatus requiring highly accurate positioning, among others.

2. The Prior Art

Various industries, and particularly the manufacturing industry, among others, have utilized linear actuators to control the movements of automated welding guns, automated clamping fixtures, and the like. Specifically, in the automotive industry and various other industries, actuation and control of welding guns and clamping fixtures and controlled linear movement of other fixtures and devices have been accomplished using fluid actuators such as pneumatic or hydraulic actuators. While fluid actuators have functioned reasonably well for these purposes, they inherently embody various limitations. One, because of the possibility of leaks and failure of seals, etc., there is always the concern of contamination of the worksite by a leaking fluid. Second, fluid actuators necessarily require a source of pressurized fluid and thus a fluid supply system. This leads to significant maintenance and other costs. Third, limitations sometimes exist with respect to the accuracy and positioning of linear movement and the adjustability of such movement.

Accordingly, there is a need in the art for an improved actuator which overcomes the deficiencies and limitations of the prior art, and in particular, an improved actuator which is designed for use in controlling the movement of, and accommodating the loads associated with, welding guns, clamping fixtures, injection molding fixtures, and various other fixtures and devices. A need also exists for an improved actuator which is particularly useful for applications requiring a relatively short linear stroke actuation and highly accurate positioning.

SUMMARY OF THE INVENTION

The present invention relates to an electric actuator having particular application to the actuation of welding guns, clamping fixtures, or the like and to injection molding and other fixtures and devices requiring relatively short actuation strokes and highly accurate positioning.

More specifically, the electric actuator of the preferred embodiment utilizes a hollow shaft motor which rotates either an externally threaded shaft or an internally threaded nut to provide controlled linear movement to a thrust or load transfer member which is in turn connected with a work piece. In one embodiment, the rotor of the hollow shaft motor is provided with an inertia reducing rotor and a unique magnet mounting arrangement which facilitates a high torque and thus high thrust actuator with minimal inertia limitations. In this embodiment, the rotor rotates the threaded shaft which results in linear movement of the threaded nut, and thus the connected thrust member. The rotor together with the thrust member and threaded shaft are provided with improved bearing and support members to provide the thrust member with improved axial and radial stability.

In a further embodiment of the actuator in accordance with the present invention, the rotor rotates the threaded nut which results in linear movement of the threaded shaft, and thus the connected thrust or load transfer member. In this embodiment, the threaded shaft may be provided with an axial bore to facilitate precise adjustment of the thrust member. This embodiment is particularly applicable in situations requiring a relatively short thrust stroke and highly accurate positioning.

A further feature of the present invention is the provision of a rotary or other similar encoder on the rotating shaft or hub of the actuator to provide accurate positioning of the thrust member.

The actuator of the present invention also includes a means and mechanism for manually overriding the electrically powered actuator in the event of a loss of electrical power, actuator jamming or other actuator malfunction. Means are also provided for accommodating the various loads (such as side loads) which are common with the actuation for welding guns and various fixtures.

Means are also provided for improving the cooling of the actuator motor by providing fluid cooling channels in the stator portion of the motor.

Accordingly, it is an object of the present invention to provide an improved actuator for welding guns, clamping fixtures, injection molding fixtures, and other fixtures and devices.

Another object of the present invention is to provide an improved electrical actuator which can replace the conventional fluid actuators of the automotive manufacturing industry, the injection molding industry and other industries without sacrificing size or weight restrictions, while still maintaining comparable thrust, speed; range of movement and load accommodation.

These and other objects of the present invention will become apparent with reference to the drawings, the description of the preferred embodiment and the appended claims.

DESCRIPTION OF THE DRAWINGS

FIG. 5 is an isometric view of the rotor in the actuator of the embodiment of FIG. 1.

FIG. 6 is a view, partially in section, as viewed along the section line 6-6 of FIG. 5.

FIG. 7 is a view, partially in section, as viewed along the section line 7-7 of FIG. 5.

DESCRIPTION OF THE PREFERRED EMBODIMENT

The present invention relates to an improved actuator for use in providing controlled and accurate linear movement to a work piece. Although the actuator of the present invention has applicability to a variety of work pieces and in a variety of industries, it has particular application to the actuation of welding guns, clamping fixtures, injection molding fixtures and any application in which controlled and accurate linear motion is required. One embodiment in accordance with the present invention has particular use in an application with a relatively short, but highly accurate, thrust stroke, although its use is not limited to that application.

In describing the actuator embodiments of the present invention, the terms "proximal" and "distal" will sometimes be used to define directions/orientations relative to the actuator. Specifically, the term "proximal" shall mean the direction which is toward the encoder end of the actuator, while the term "distal" shall mean the direction which is toward the work piece connection end of the actuator.

Figure 1:
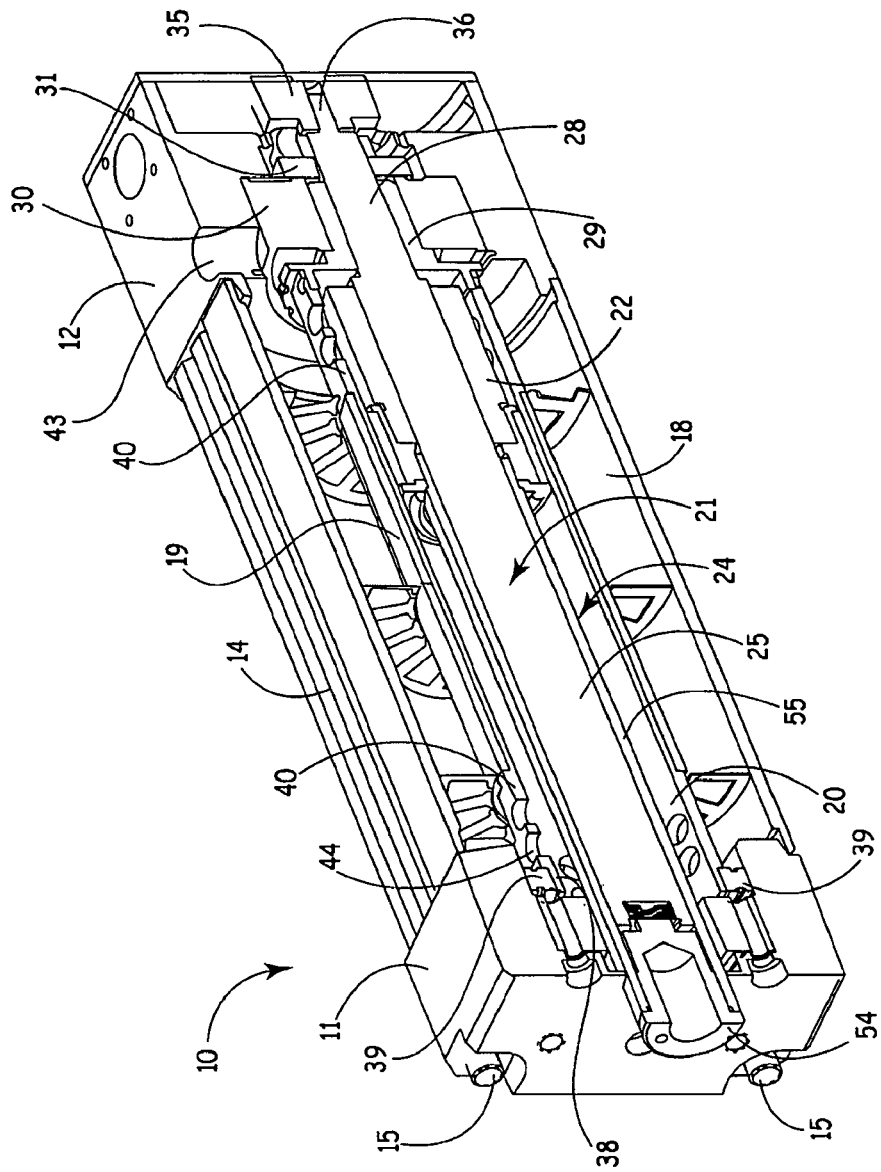
FIG. 1 is an isometric view, partially in section, of one embodiment of the actuator of the present invention. The section portion is viewed along a plane extending along and through the longitudinal axis of the actuator.
Figure 2:
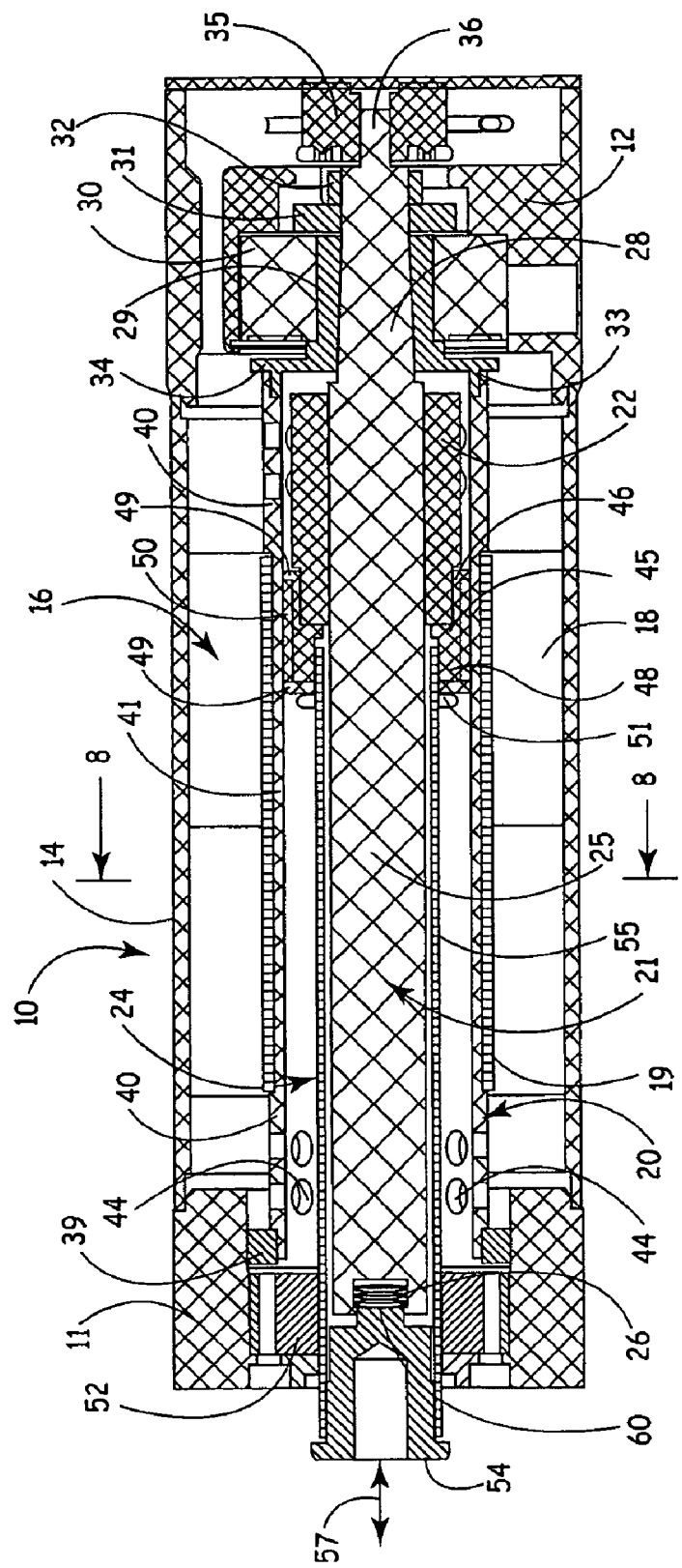
FIG. 2 is a view, partially in section, of the actuator of the embodiment of FIG. 1 as viewed along a plane extending along and through the longitudinal axis of the actuator.
Figure 3:
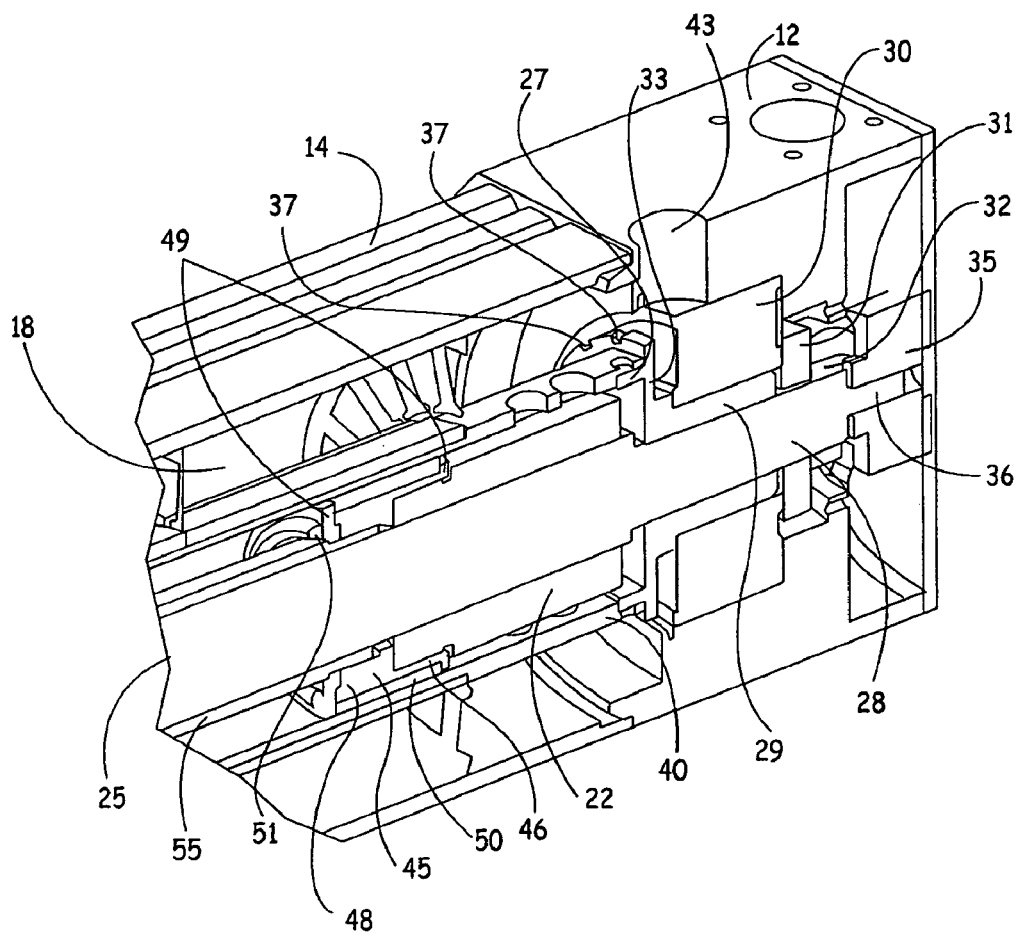
FIG. 3 is an enlarged isometric view of the proximal end of the actuator of FIG. 1 showing the relationship between the rotor, the threaded shaft and the thrust tube.
Figure 4:
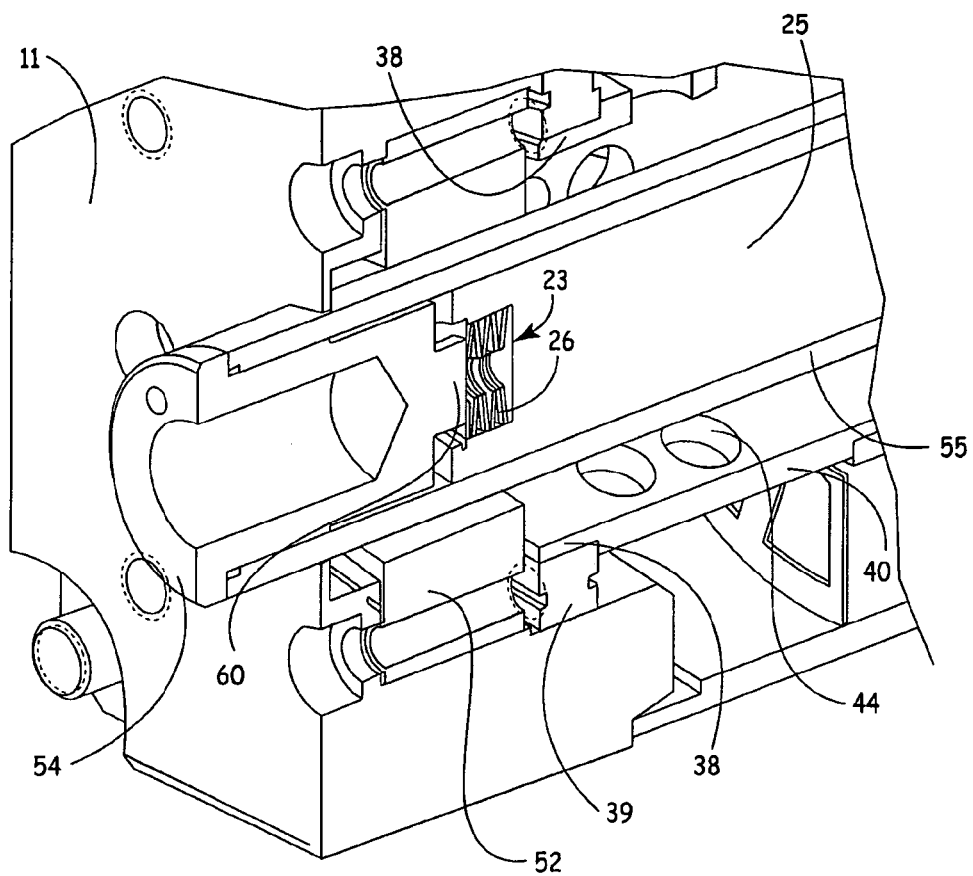
FIG. 4 is an enlarged isometric view of the distal end of the actuator of FIG. 1.
Figure 8:
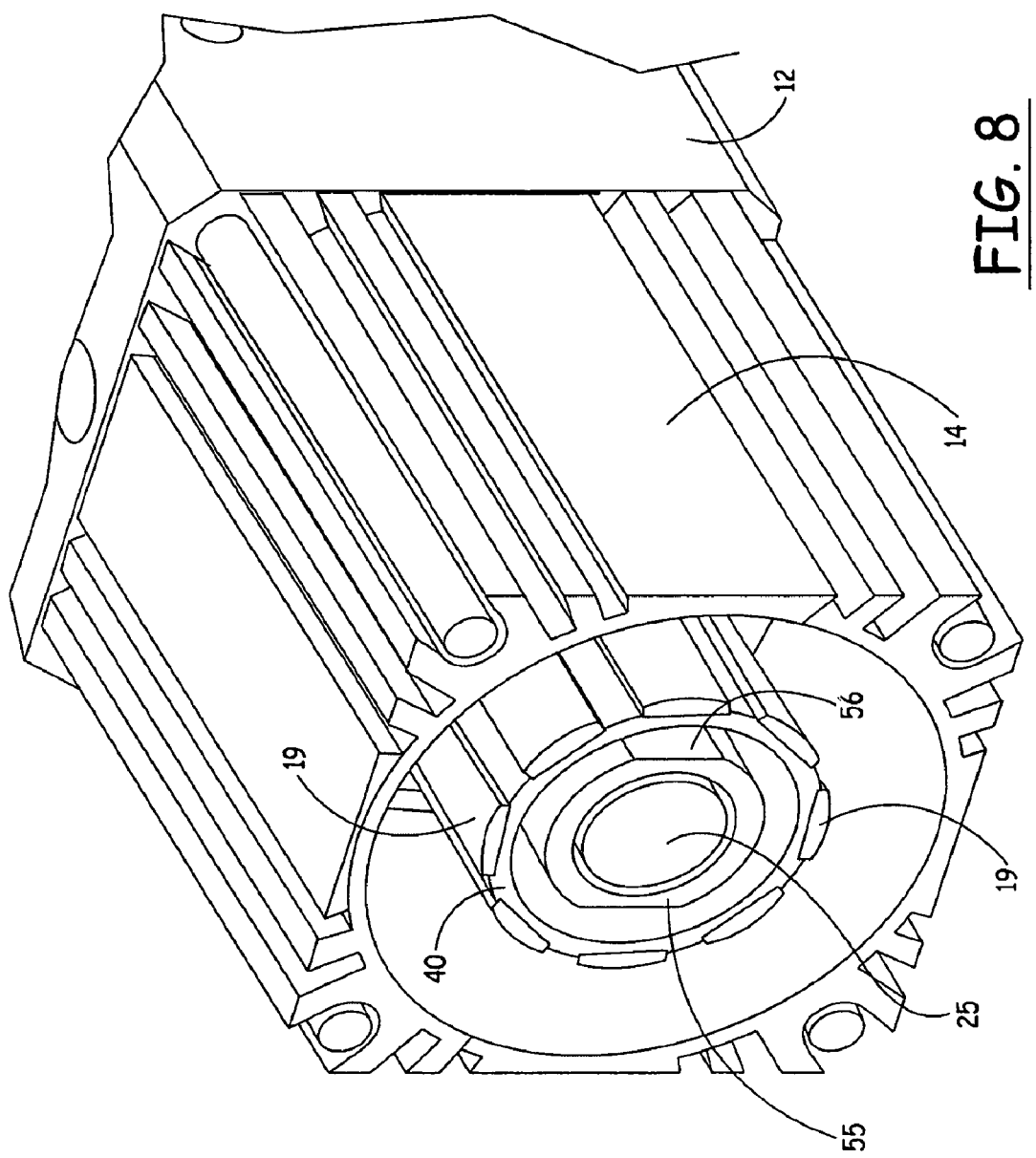
FIG. 8 is an isometric view, partially in section, of the actuator of FIG. 1 as cut vertically through its center section.
Figure 9:
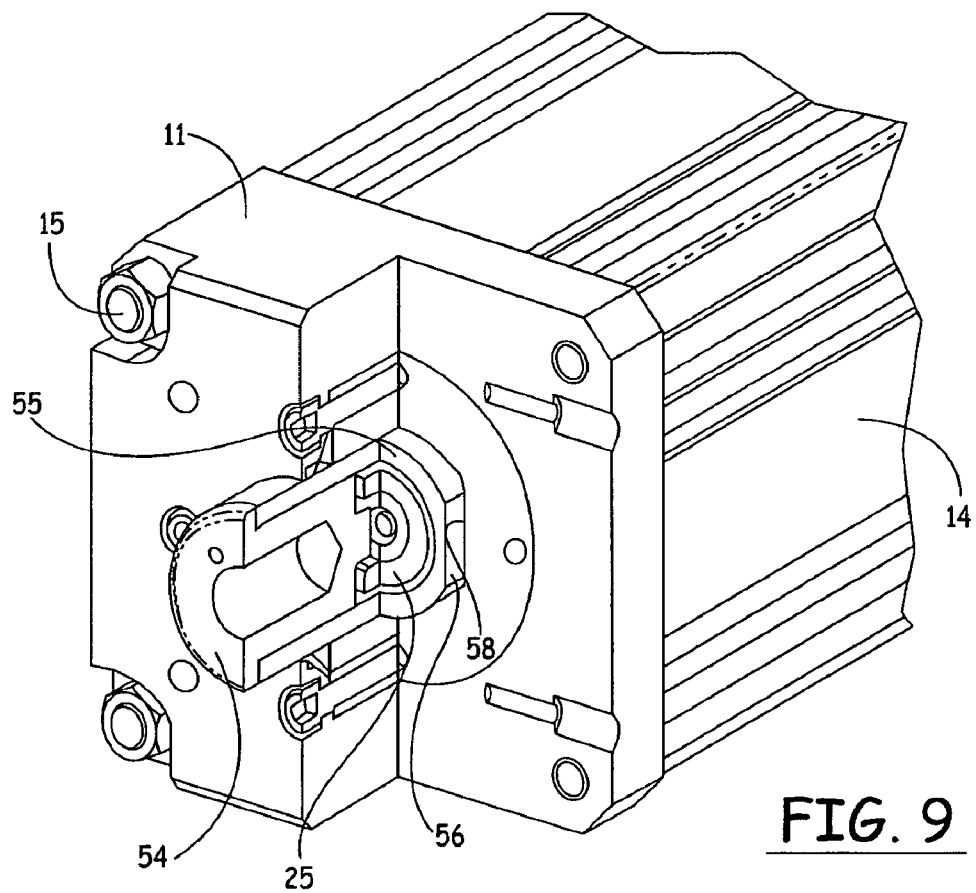
FIG. 9 is an isometric view, partially in section, of the actuator of FIG. 1 as viewed from the distal end.

In describing a first embodiment of the present invention, reference is first made to FIGS. 1, 2, 3, 4, 8 and 9. FIGS. 1 and 2 show isometric and sectional views, respectively, of a first embodiment of the present invention, while FIGS. 3 and 4 show enlarged isometric/sectional views of the proximal and distal ends. FIGS. 8 and 9 show views with portions broken away. In general, the preferred embodiments characterize the present invention as utilizing what is often referred to in the art as a hollow shaft motor comprising motor windings and a rotor which surround a centrally located linear thrust mechanism. However, such a motor is not required to practice many features of the invention.

The actuator 10 of the embodiment of FIGS. 1, 2, 3 and 4 includes an actuator housing comprised of a distal head end or block 11, a proximal head end or block 12 and a centrally positioned peripheral housing portion 14. As shown, the housing section 14 is positioned between the end blocks 11 and 12 and is retained in that position between the blocks 11 and 12 by a plurality of elongated threaded members 15 (FIG. 1) in a conventional manner. A hollow shaft motor 16 (FIG. 2) comprising a plurality of motor windings 18, a plurality of motor magnets 19 and a rotor 20 is positioned between the end blocks 11 and 12 and radially inwardly of the housing portion 14.

An externally threaded, elongated shaft or lead screw 21 and an internally threaded nut 22 together comprise a linear thrust mechanism. The linear thrust mechanism, comprised of the screw 21 and the nut 22, is positioned radially inwardly from the rotor 20 and functions to convert rotational motion of the rotor 20 to linear movement of a thrust tube or load transfer member 24. As shown, the rotor surrounds a substantial portion of the thrust assembly.

More specifically, the elongated, externally threaded screw 21 includes a main, externally threaded section 25 which is provided with continuous threads along a substantial portion of its length. As used herein, the term "thread" or "threaded" to define the threaded section 25 of the screw 21 may include any conventional or other threads such as ACME threads, roller screw threads, ball nut threads or any means known in the art to convert rotational motion to linear motion. The distal end of the threaded section 25 is provided with a recessed area 23 (FIG. 4). This recessed area 23 includes compliant means in the form of a plurality of Belleville or wave washers 26 or other depressible spring type members to cushion impact between the distal end of the screw 21 and the thrust tube 24. Such impact cushioning is particularly needed during power up or in the case of a runaway. In such situations, the compliant means 26 assists in preventing or reducing lockup of the actuator and possible damage to the nut 22 (FIGS. 1, 2 and 3).

The proximal end of the screw 21 includes a tapered section 28 which tapers inwardly toward the proximal end. The proximal end comprises a reduced diameter end section 36 designed for connection to the rotation sensing portion of a rotary encoder 35. The tapered section 28 extends through a hub 29 and is connected for rotation with such hub 29. The hub 29 includes an inner surface having a taper similar to the taper of the section 28. A thrust bearing 30 is positioned radially outwardly from the hub 29 and functions to mount and support the hub 29 and thus the proximal end of the screw 21 within the end block 12. As shown best in FIGS. 2 and 3, the tapered section 28 and the hub 29 are retained relative to the bearing 30 by the retaining washer 31 and the nut 32. Specifically, the bearing 30 is captured between a shoulder portion 34 of the hub 29 and the washer 31. The distal end of the hub 29 includes a radially extending flange 33 and an axially extending rotor mounting portion 27 for mounting and supporting the proximal end of the rotor 20.

The outer peripheral edge of the flange 33 includes a plurality of notches or recessed areas 37. These notches or areas 37 are accessible to the end of a screwdriver or other tool (not shown) through an access hole 43 in the end block 12 to provide a manual override feature to the actuator. If a crash or lockup occurs or if motor power is lost, the end of a screwdriver or other tool can be inserted through the hole 43 to engage the notches 37 and manually rotate the flange 33 and thus the rotor 20. This rotation releases the lockup and permits the actuator to resume operation.

A rotary encoder 35 or other similar means is mounted to the end section 36 of the threaded screw 21, either directly or through a coupling as shown in the embodiment discussed below. Because of axial and other forces being applied to the screw 21 during operation, it is preferable for the body of the encoder 35 to be connected to the actuator housing through a flexible mount. Such a flexible mount is known in the art. In the preferred embodiment, the encoder 35 is a hollow shaft encoder (either incremental or absolute) having a central rotation sensing member or portion mounted directly onto the proximal end extension 36 of the screw 21.

The motor 16 is a hollow shaft motor comprising a centrally located, hollow rotor 20 and one or more stationary motor windings 18. The windings 18 are positioned radially outwardly of the rotor 20 and are fixed relative to the actuator housing. As shown best in FIGS. 1-7, the rotor 20 is a generally cylindrical member having a generally cylindrical outer surface and a hollow cylindrical interior surface. The distal end of the rotor 20 is provided with a recessed portion 38 to accommodate a bearing 39 (FIGS. 1, 2 and 4). The bearing 39 is an axial floating bearing which supports and stabilizes the distal end of the rotor 20 relative to the distal end block 11. Because the bearing 39 is allowed to float axially, it accommodates any thermal expansion of the rotor 20 during operation. The proximal end of the rotor 20 is connected with the axially extending rotor mounting portion 27 of the hub 29 as shown best in FIGS. 1 and 2. This is a rigid connection so that rotation of the rotor 20 causes corresponding rotation of the hub 29 and, in the embodiment of FIGS. 1-9, the screw 21.

The central portion 41 of the rotor 20 is provided with a plurality of motor magnets 19. As shown, the magnets 19 are mounted so that they extend axially along an outer surface of the rotor 20 between its proximal and distal ends 40,40. Preferably, the magnets 19 are inlaid within an outer surface portion of the rotor as shown best in FIGS. 5, 6 and 7. Specifically, axially extending portions of the outer surface of the central portion 41 of the rotor 20 are removed by machining or the like to form axially extending channels or grooves 47 around the cylindrical periphery of the rotor 20. These channels or grooves 47 permit the magnets 19 to be inlaid within these channels or grooves 47 in the outer surface of the rotor 20. As shown, this provides the rotor 20 with thicker wall sections at the proximal and distal ends 40,40 extending axially outwardly on either side of the magnets 19 and thinner wall sections 41 (FIGS. 6 and 7) in the channel areas where the magnets are mounted. This structure also provides a radially thicker, axially extending rib or section 42 between adjacent magnets 19 and between adjacent channels 47. This magnet mounting structure enables the mass of the rotor 20 to be reduced in the area of the thinner walls 41, while still providing sufficient material in the form of the axially extending ribs 42 to preclude or limit core saturation of the magnets. These ribs 42 provide two functions. First, it facilitates simple assembly without additional tooling for alignment. Second, it provides additional material to reduce or prevent core saturation due to the high flux of the magnets. Because the rotor wall thickness in the area of the channels 47 is very thin, without this additional material of the ribs 42, saturation is likely to occur. This added material of the ribs also aids in prevention of flux leakage into the rotor core.

Accordingly, the rotor structure in accordance with the present invention preferably includes a plurality of elongated magnets 19 mounted to the exterior of the rotor 20 with such magnets 19 being circumferentially spaced from one another and with the thickness of the rotor wall portions 41 in the area of the magnets 19 being thinner than the rotor wall portions 42 in the area between the side edges of the circumferentially spaced magnets 19. This is shown best in FIGS. 5, 6 and 7. In the preferred structure, the magnets 19 are partially inlaid relative to the areas 42. Thus, the inner surface of the magnets 19 is positioned radially inwardly of the outer surface of the areas 42, and the outer surface of the magnets 19 is positioned radially outwardly of the outer surface of the areas 42.

As shown, the outer or proximal and distal ends of the rotor are provided with a plurality of holes or apertures 44 extending through the wall sections 40 for the purpose of reducing inertia of the rotor 20. This in turn reduces the amount of torque required to accelerate and/or decelerate the rotor 20. If desired, the holes 44 can be eliminated.

When mounted in the actuator, as shown in FIGS. 1 and 2, the distal end of the rotor 20 is supported relative to the end block 11 via the axial floating bearing 39 and the proximal end of the rotor 20 is connected with the portion 27 of the hub 29 for rotation therewith. The portion 27 and the hub 29 are in turn supported relative to the end block 12 by the thrust bearing 30. Thus, as the rotor 20 rotates, it rotates the hub 29 which in turn rotates the threaded screw 21.

The linear motion or thrust assembly of the actuator of the present invention includes the thrust tube or load transfer member 24, the threaded nut 22, the threaded screw 21 and the connection and bearing support member 45 between the nut 22 and tube 24. The member 45 includes a proximal end 46 with internal threads. These internal threads permit the end 46 to be threadedly connected to external threads on the distal end portion of the nut 22. The member 45 also includes a distal end 48 with internal threads. These internal threads permit the end 48 to be threadedly connected to external threads on the proximal end of the thrust tube 24. Outer bearing retaining flanges 49 on each end of the member 45 retain a sleeve shaped bearing member 50. The bearing member 50 is a cylindrical sleeve section constructed of a low friction plastic or other material which engages and moves axially along the inner surface of the rotor 20 to guide axial movement of the proximal end of the thrust tube 24.

The thrust tube guide assembly which comprises the connecting member 45 and the bearing 50 assists in removing side loading from the screw 21 and the nut 22 by aligning the thrust tube 24 within the rotor 20. With the above-described guide assembly, any side load applied to the thrust tube 24 beyond the distal end block 12 is transferred to the guide assembly rather than to the nut 22. The guide assembly then transfers such load to the rotor 20 which is in turn supported by the distal bearing member 39.

In the preferred embodiment, a cushion or impact reducing member 51 is provided on the distal side of the member 45. In the preferred embodiment, this member 51 may be an O-ring or other compressible material. During operation, this member 51 will engage the proximal surface of the guide bushing 52 in the case of a runaway or during power up procedures, thereby preventing or limiting damage to the nut 22.

The nut 22 is connected with the proximal end of the thrust tube 24 through the member 45 as described above. The nut 22 includes internal threads which mate with the external threads on the outer surface of the screw 21. As described above with respect to the screw 21, the internal threads of the nut 22 and the external threads of the screw 21 may be any conventional or other threads such as ACME threads, roller screw threads, ball or ball nut threads or any other means known in the art to convert rotational motion to linear motion. In the preferred embodiment, the threads of the nut 22 and the screw 21 are recirculating ball threads.

As described above, the proximal end of the thrust tube 24 is connected with the nut 22 by the connection member 45. Accordingly, the nut 22, the connection member 45 and the thrust tube 24 move axially in unison along the screw 21. The distal end of the thrust tube 24 includes a work piece connection member 54 to which a work piece (not shown) may be connected. An inwardly extending portion 60 of the member 54 engages the washers 26 in the event of a runaway or during power up procedures or when the thrust tube 24 is in its fully retracted position. The thrust tube 24 includes an elongated, hollow tubular portion 55 which extends between its proximal and distal ends. The tubular portion has a hollow interior to receive and accommodate the threaded lead screw 21. As shown best in FIGS. 8 and 9, the exterior of the tube 55 is provided with a pair of diametrically opposed anti-rotation flat portions 56. These flat portions 56 extend the length of the tubular portion 55 and engage corresponding inner flat surfaces 58 in the end block 11 and corresponding inner flat surfaces in the guide bushing 52 to prevent the thrust tube 24 and thus the connection member 45 and the nut 22 from rotating.

Having described the structure of the embodiment of FIGS. 1-9, its operation can be described as follows. When the motor 16 is actuated, the rotor 20 is caused to rotate in a first direction. Because the proximal end of the rotor is connected with the hub 29, which is in turn connected to the screw 21, rotation of the rotor 20 results in corresponding rotation of the screw 21 in the first direction. Because the thrust tube 24 and thus the member 45 and the nut 22 are prevented from rotating, rotation of the screw 21 relative to the nut 22 causes the nut 22 and thus the connection member 45 and the thrust tube 24 to move linearly along the screw 21 in a first linear direction. If the rotor 20 is caused to rotate in the opposite or second direction, the screw 21 is similarly rotated in the opposite or second direction. This results in the nut 22, the connection member 45 and the thrust tube 24 being moved linearly in the opposite or second direction. Thus, rotational movement of the rotor 20 results in corresponding linear movement of the thrust tube 24 as shown by the directional arrow 57 (FIG. 2).

Figure 10:
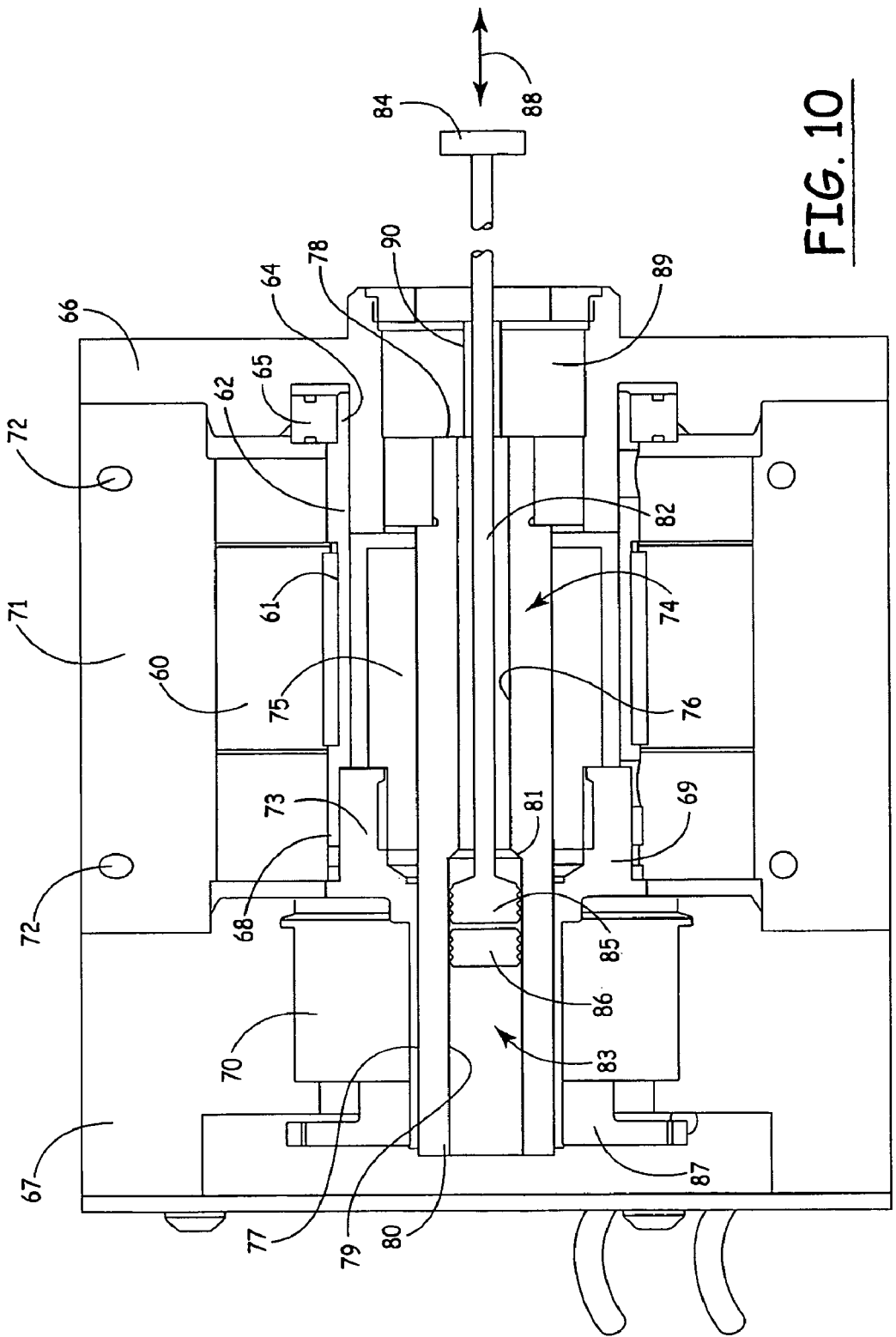
FIG. 10 is a view, partially in section, of a further embodiment of an actuator in accordance with the present invention.
Figure 11:
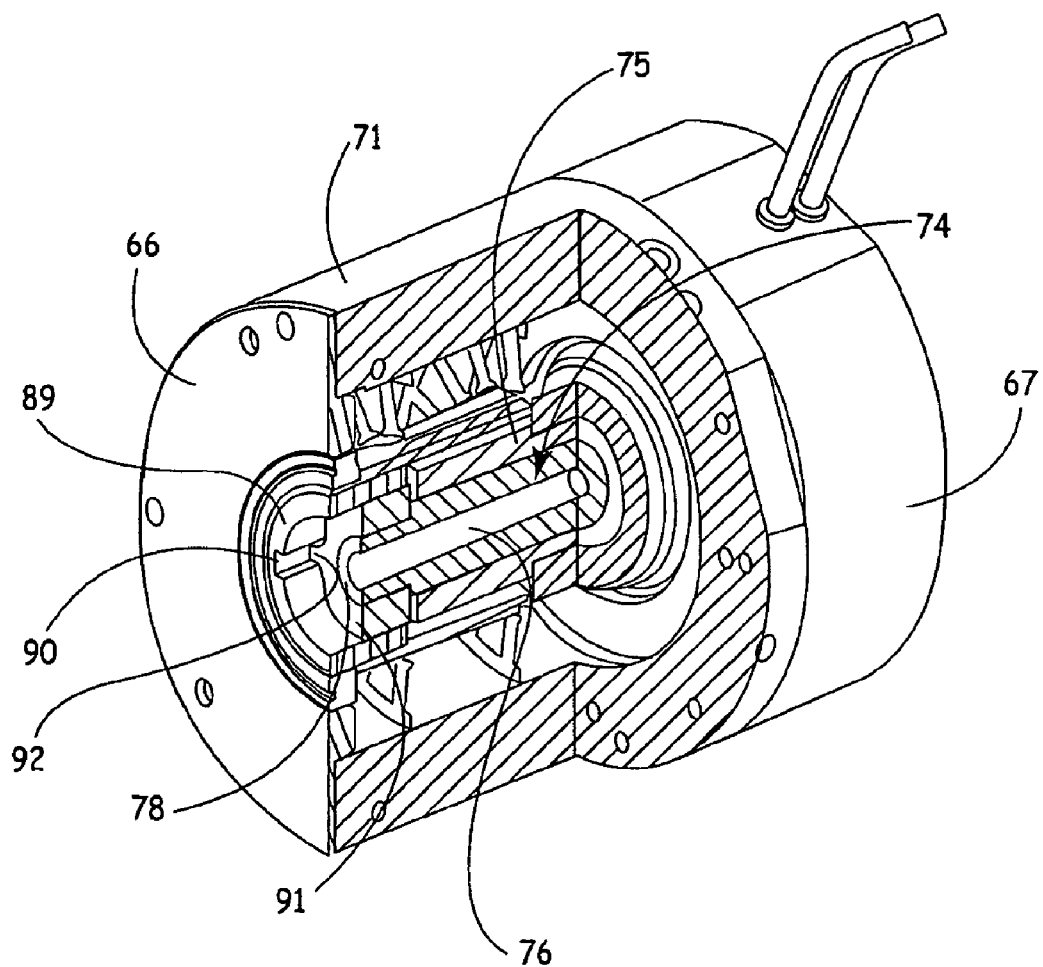
FIG. 11 is an isometric view of the actuator embodiment of FIG. 10 as viewed from the distal end, with portions broken away.
Figure 12:
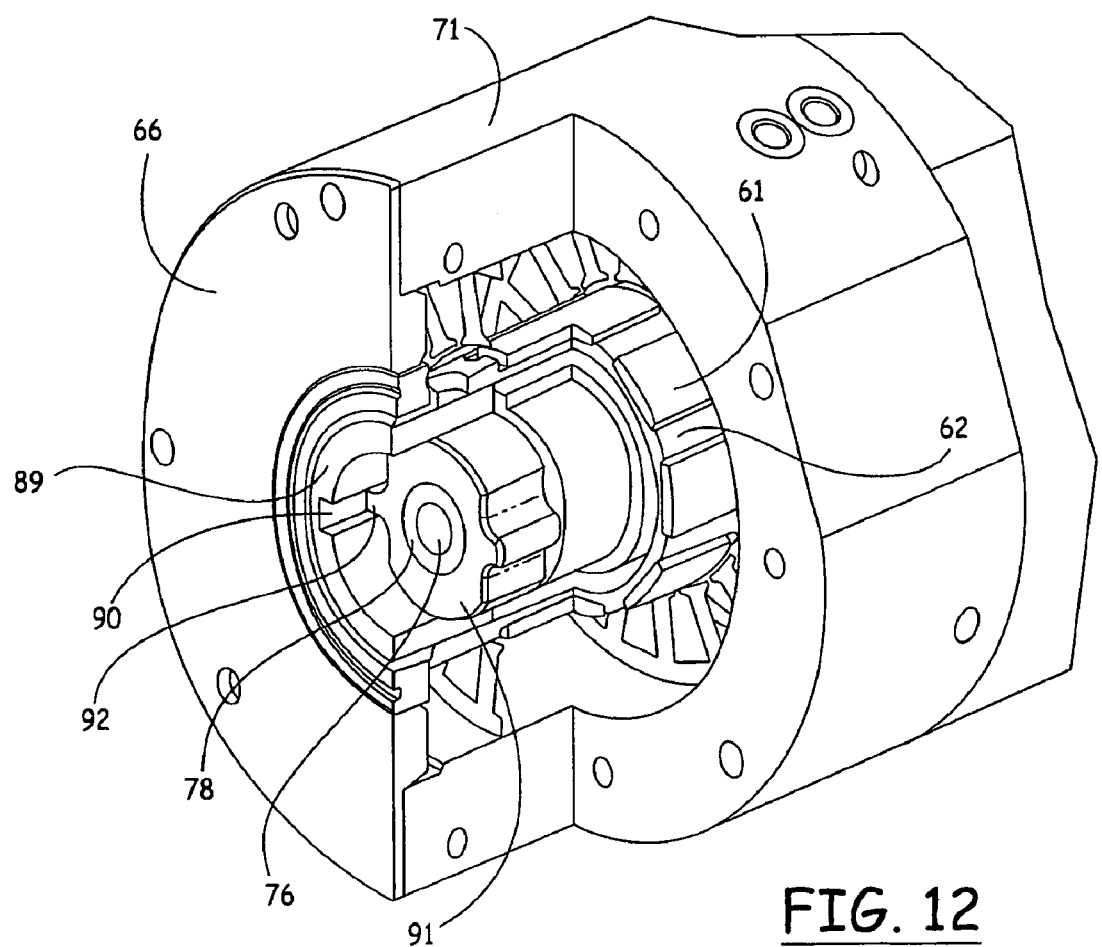
FIG. 12 is an enlarged isometric view of the distal end of the actuator embodiment of FIG. 10, with portions broken away.

A second embodiment in accordance with the present invention is shown in FIGS. 10-12. This embodiment includes an actuator housing comprised of the end blocks 66 and 67 and the central housing member 71. The member 21 is retained between the end blocks 66 and 67 by a plurality of threaded screws or bolts in a conventional manner. This embodiment also includes a hollow shaft motor comprising motor windings 60, motor magnets 61 and a rotor 62, although such a motor is not required. Similar to the embodiment described above, the rotor 62 includes a distal end 64 supported by the bearing 65 which is in turn mounted within the distal end block 66. The proximal end 68 of the rotor 62 is connected for rotation with a hub 69. The hub 69 is in turn supported by the thrust bearing 70 mounted within the proximal end block 67. The rotor 62 may, if desired, be provided with inertia reducing holes similar to the holes 44 shown in the rotor embodiment of FIG. 5.

In the embodiment of FIGS. 10-12, the rotor 62 and the hub 69 may be fixedly connected to one another by welding or the like. The rotor 62 may also, if desired, be shortened as shown in the embodiments of FIGS. 13-16 so that it has a free end which is unsupported.

The motor magnets 61 are inlaid within the rotor 62 similar to that described above with respect to FIGS. 1-9, or may otherwise be mounted to the exterior surface of the rotor 62. In this embodiment, a motor cooling means is provided. This cooling means is comprised of a water or other cooling fluid cooling mechanism positioned within the housing portion 71 radially outwardly from the motor windings 60. The cooling mechanism includes the extended motor stator in the form of the aluminum housing portion 71 and cooling fluid inlet and outlet ports 72 connected with cooling fluid circulation lines within the housing 71. Appropriate fittings are provided for the ports 72. During cooling operation, cooling fluid is introduced into one of the ports 72, circulated through the circulation lines within the portion 71 and then removed through the other port 72.

The embodiment of FIGS. 10-12 also includes a centrally positioned externally threaded shaft or screw 74 and a corresponding internally threaded nut 75. As described above, the threads on the exterior surface of the screw 74 and the internal surface of the nut 75 may be any conventional or other threads such as ACME threads, roller screw threads, ball screw threads or any other similar means. Unlike the embodiment of FIGS. 1-9 where the hub 29 is connected to the screw 21 for rotation therewith and the nut is rotationally fixed, the hub 69 in the embodiment of FIGS. 10-12 is connected to the nut 75 for rotation therewith and the screw 74 is rotationally fixed. Thus, in the FIG. 10-12 embodiment, preventing the rotational motion of the screw 74, results in axial movement of the screw 74 as the rotor 62, hub 69 and nut 75 rotate. It should be noted that only that portion of the screw 74 which engages the nut 75 needs to be threaded. This is primarily the central portion of the screw 74, with the threads extending for a sufficient distance to accommodate the thrust stroke.

The hub 69 includes a distal flange portion 73 and a proximal end portion 77. The distal flange portion 73 is fixedly connected to both the proximal end 68 of the rotor 62 and the proximal end of the nut 75 for rotation therewith. The proximal end portion 77 is a sleeve-like portion having an internal surface surrounding the proximal end portion of the screw 74. Because the end portion 77 of the hub 69 and the proximal end portion of the screw 74 are designed for relative rotational and axial motion, one or more of their respective engaging surfaces may be constructed of, or provided with, a low friction bearing material.

A rotary encoder 87 or other similar encoder means is mounted on the proximal end of the hub portion 77 to sense and measure the rotational movement of the hub 69 and nut 75. Because the screw 74 has a bore extending axially throughout its entire length, and thus access to such bore is needed, the encoder in accordance with the embodiment of FIGS. 10-12 is a magnetic ring encoder.

In the embodiment of FIGS. 10-12, the screw 74 is provided with a hole or bore 83 extending axially through its entire length from its proximal to its distal end. In the preferred embodiment, this hole 83 includes an axially extending distal hole or bore portion 76 extending from the distal end of the screw 74 toward its proximal end and a proximal hole or bore portion 79 extending from the proximal end 80 of the screw 74 toward its distal end, with the bore portions 76 and 79 meeting at the juncture 81. In the preferred embodiment, the hole portion 79 is provided with internal threads.

Associated with the screw 74 is a linear motion transfer rod or load transfer member 82. This member 82 includes a distal end 84 designed for connection to a work piece (not shown). A proximal end 85 of the member 82 includes external threads designed to be received by the internal threads of the bore portion 79. When assembled, the member 82 extends outwardly from the distal end 78 of the screw 74 and is retained in a desired axial position relative to the screw 74 by the threaded connection between the end 85 and the threaded bore portion 79. To further retain the rod 82 in the desired axial position relative to the screw 74, a jam nut 86 with a slot or hex end may be provided. The proximal end 85 is also provided with rotation means such as a slot, hex opening, or the like, to permit the end 85 to be rotated with a screwdriver, an allen wrench or other tool. Rotation of the end 85 within the threaded bore 79 causes the rod 82 to be advanced or retracted axially relative to the screw 74. This permits precise and accurate adjustment of the rod 82, and thus the distal load connection end 84, relative to the screw 74. Such adjustment is often more accurate than the electronic adjustment commonly made via the encoder and control mechanism. This embodiment is particularly applicable for actuators with relatively short strokes where highly accurate adjustment is required and where electronic adjustment via the encoder and control mechanism is greater than the permitted tolerance of the stroke.

While the preferred embodiment shows the rod 84 mounted within the screw 74, it is contemplated that actuation mechanisms or devices other than an elongated rod 82 may also be mounted to the screw 74 or within the screw 74 for controlling linear movement of such mechanism or device.

In the embodiment of FIGS. 10-12, the hub 69 is connected with the nut 75 for rotation therewith. Accordingly, rotation of the rotor 62 causes rotation of the hub 69 and corresponding rotation of the nut 75. Thus, when rotational movement of the screw 74 is prevented or restrained, the screw 74 will move linearly relative to the nut 75 when the nut is rotated. The means for preventing rotation of the screw 74 is shown best in FIGS. 11 and 12. This includes the anti-rotation sleeve 89 and the anti-rotation key 91. As shown, the anti-rotation sleeve 89 includes a pair of diametrically opposed anti-rotation slots and the anti-rotation key includes a pair of diametrically opposed anti-rotation ribs 92. The anti-rotation sleeve 89 and thus the slots 90 are fixed to the housing of the actuator, while the anti-rotation key 91 and thus the ribs 92 are fixed to the screw 74. The slots 90 are sized and configured to receive the ribs 92 in axially sliding relationship as the screw 74 moves axially relative to the housing. Because the sleeve 89 is fixed to the actuator housing, the sliding engagement between the ribs 92 and the slots 90 allows axial movement, but prevents rotational movement, of the screw 74.

Having described the structure of the embodiment of FIGS. 10-12, its operation can be described as follows. As the motor 60 causes the rotor 62 to rotate, corresponding rotation of the hub 69 and the nut 75 will occur. Because the screw 74 is prevented from rotating via the anti-rotation mechanism shown in FIG. 11, such rotation of the nut 75 causes corresponding linear or axial movement of the screw 74. This linear movement of the screw 74 (the linear direction of which depends on the rotational direction of the nut 75) results in corresponding linear movement of the rod 82 and thus the work piece connection end 84 in the linear direction shown by the arrow 88.

While this embodiment has applicability for any situation in which accurate and controlled reciprocal linear motion is required, it has particular application in situations requiring a relatively short stroke, usually a stroke on the order of less than two inches or a stroke on the order of one inch or less and/or which requires adjustment smaller than that permitted by the encoder.

If an adjustment is needed with respect to the outermost or innermost end of the stroke, the jam nut 86 can be removed and the proximal end member 85 can be rotated to accomplish the desired adjustment. The jam nut can then be replaced to secure the end 85 and the rod 82 in that position. Such adjustment by rotation of the end 85 can be made extremely accurately and, in many cases, more accurately than can be made via a motor and the encoder 87.

Accordingly, by providing the screw 74 with an axial bore 83 as shown in the embodiment of FIGS. 10-12, a means is provided for adjusting the thrust end of the thrust mechanism from the proximal end of the actuator. Specifically, this is done by rotating the threaded end 85 of the rod 82 within the bore portion 79. Although such an adjustment mechanism is shown in combination with the embodiment of FIGS. 10-12 in which the nut 75 rotates and the screw 74 moves axially, a similar adjustment feature can be provided to the embodiment of FIGS. 1-9 in which the screw 21 rotates and the nut 22 moves axially. For example, by providing an axial bore through the length of the screw 21 of FIGS. 1-9, and by providing the distal end 54 of the thrust mechanism with threaded (or other) adjustment means, adjustment access to such adjustment means can be provided from the proximal end of the actuator through the bore in the screw 21.

Figure 13:
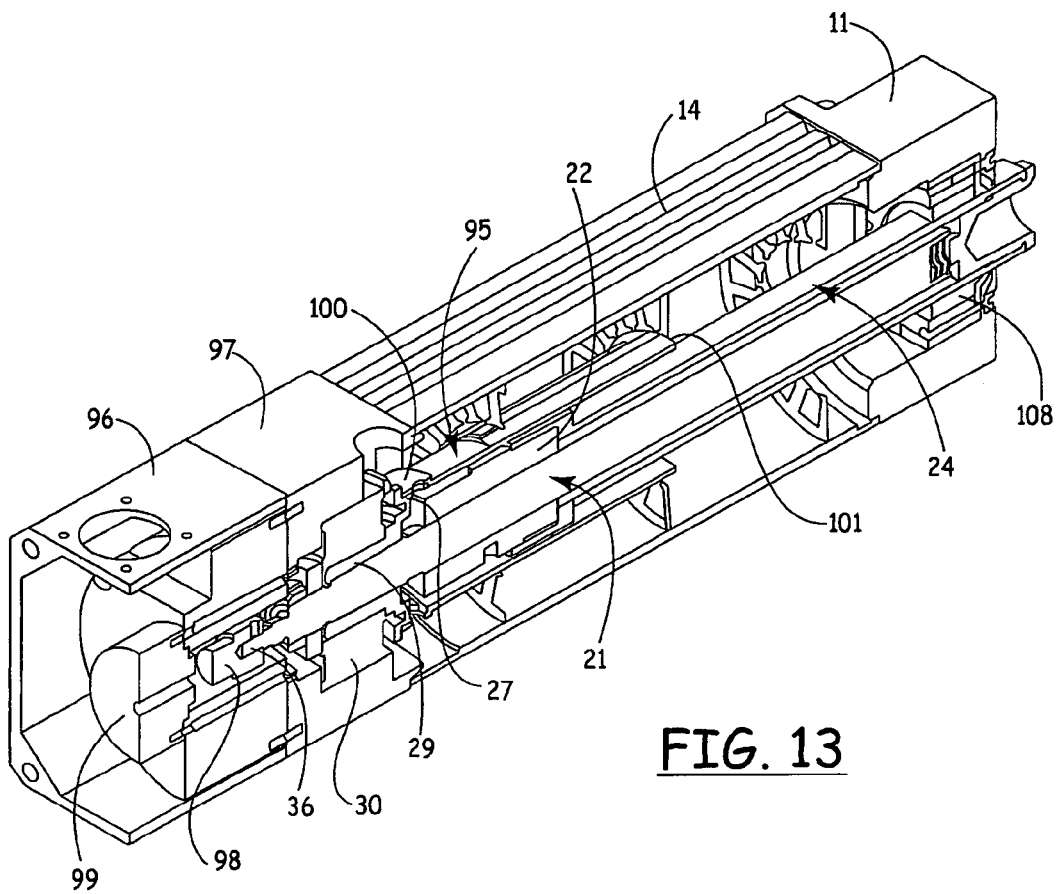
FIG. 13 is an isometric view, partially in section, of a further embodiment of the actuator of the present invention, with the section portion being viewed along a plane extending along and through the longitudinal axis of the actuator.
Figure 14:
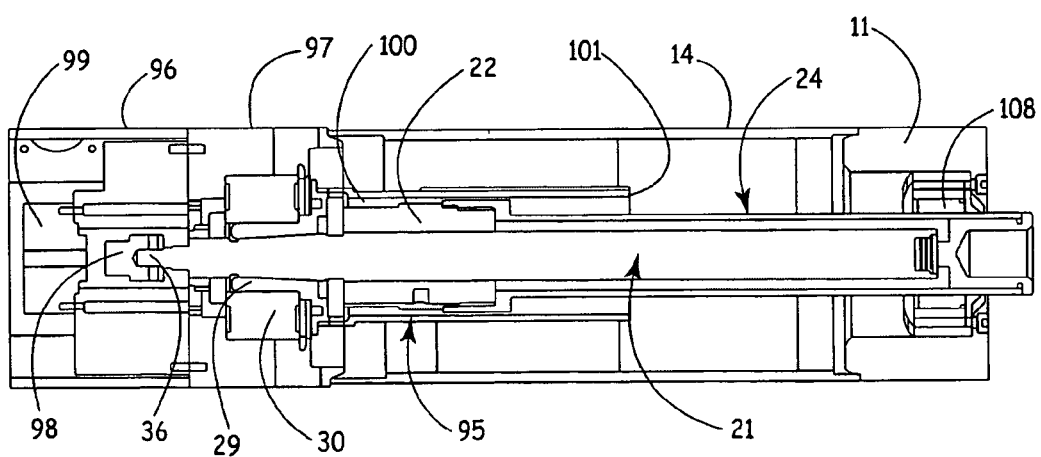
FIG. 14 is a view, partially in section, of the actuator of the embodiment of FIG. 13 as viewed along a plane extending along and through the longitudinal axis of the actuator.
Figure 16:
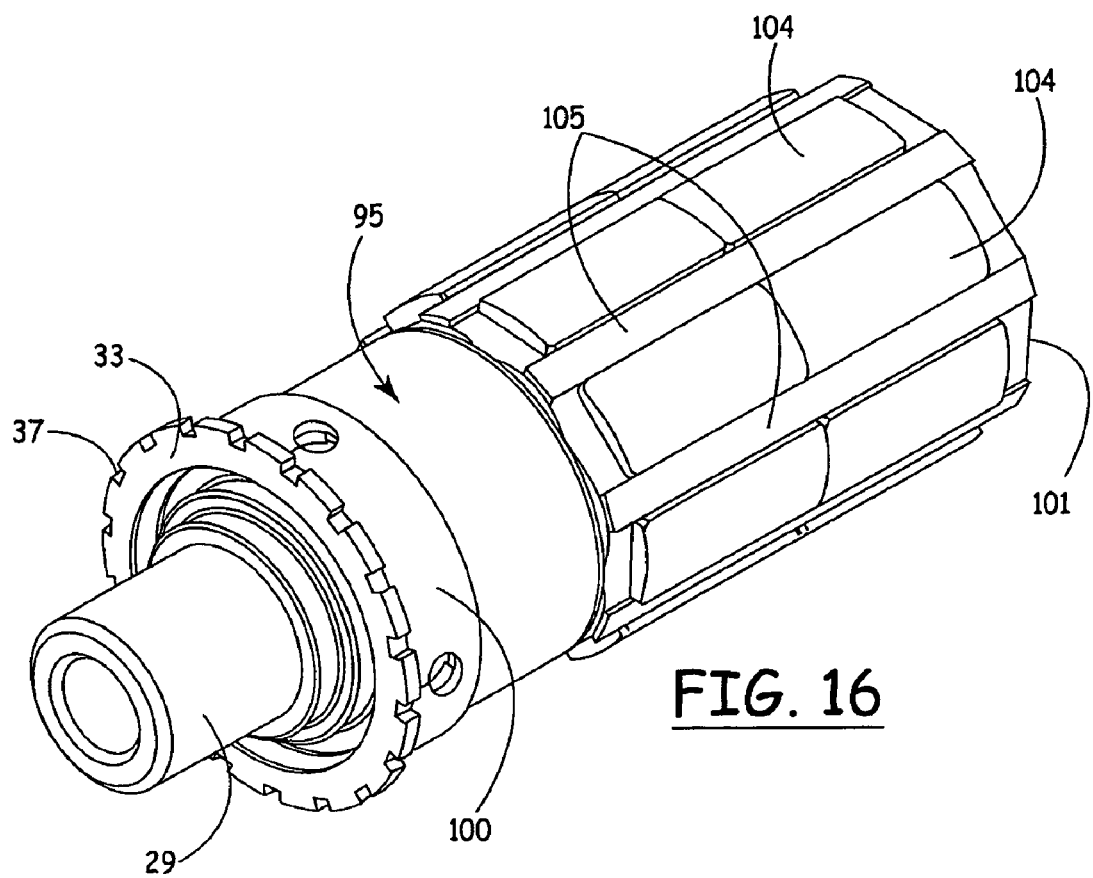
FIG. 16 is an isometric view of the rotor and hub portion of the actuator embodiment of FIGS. 13 and 14.
Figure 15:
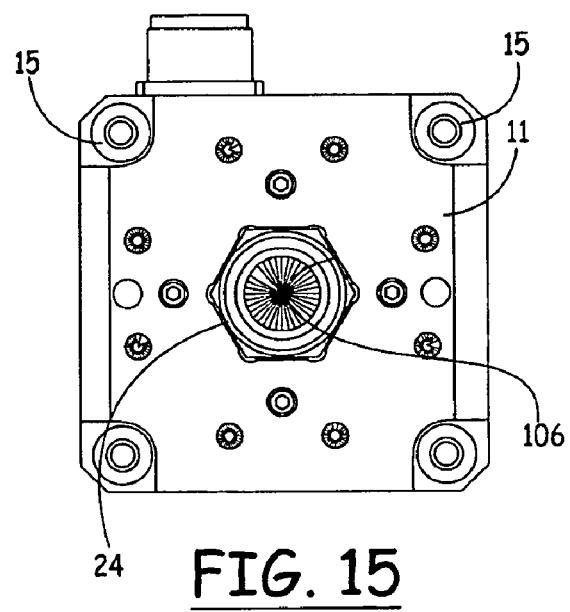
FIG. 15 is a distal end view of the actuator embodiment of FIGS. 13 and 14.

FIGS. 13-16 show a further embodiment of an electric actuator in accordance with the present invention. This embodiment is similar to the embodiment of FIGS. 1-9 in that it includes an externally threaded screw 21 which is rotatable relative to the housing, a nut 22 which is rotationally fixed, but axially moveable relative to the actuator housing and a thrust tube 24 which is connected to and axially moveable with the nut 22. The embodiment of FIGS. 13-16 differs from the embodiment of FIGS. 1-9 in several respects. One difference involves the construction and mounting of the rotor relative to the actuator housing. With particular reference to FIGS. 13, 14 and 16, the rotor 95 includes a proximal end 100 which is connected for rotation with the hub 29 and a distal free end 101 which is unsupported. Thus, the rotor 95 is cantilevered relative to the hub 29 and extends partially along the length of the actuator as shown best in FIGS. 13 and 14.

As shown in FIG. 16, the modified rotor 95 includes a generally cylindrical section 102 adjacent to its proximal end and a plurality of magnets 104. The magnets are connected with the outer surface of the main body of the rotor 95 and are circumferentially spaced around the entire circumference of the rotor 95. A magnet separation rib 105 separates adjacent magnets 104 from one another.

In the embodiment of FIGS. 13 and 14, the thrust tube 24 and the nut 22 are operatively connected with one another so that axial movement of the nut 22 is transferred to the thrust tube 24. This connection may be a threaded or other direct connection as shown in FIGS. 13 and 14 or may comprise a connection mechanism similar to that shown in the embodiment of FIGS. 1-9. Still further, the connection may include any other connection mechanism known in the art.

The embodiment of FIGS. 13-16 further differs from the embodiment of FIGS. 1-9 in that the thrust tube 24 of FIGS. 13-16 includes anti-rotation means in the form of a hexagonal exterior configuration. This is shown best in FIG. 15 in which the thrust tube 24, with a hexagonal exterior configuration, passes through the end plate of the housing 12 with a hexagonal interior configuration. A bearing member 108 with a hexagonal interior opening is mounted within the distal housing member 12 to further guide axial movement of the thrust tube 24 and to preclude rotational movement of the thrust tube 24 and the connected nut 22 relative to the actuator housing. Appropriate seal and scraper means are associated with the bearing 108 for preventing dust and the like from entering the interior of the actuator.

The proximal end of the embodiment of FIGS. 13-16 further differs from the embodiment of FIGS. 1-9 in that the proximal end block 12 of FIGS. 1-9 has been replaced with a two part end block comprised of a bearing support housing member or end block 97 and a selectively connectable encoder housing portion 96. The housing member 97 includes the bearings 30 for rotatably supporting the hub 29 while the housing portion 96 is provided with an encoder 99. Such encoder 99 may comprise any one of a variety of encoder models and configurations. The housing portion 96 is selectively connectable to the housing portion 97 by threaded connections or other conventional connection means. If needed, a coupling member 98 is provided between the proximal end 36 of the screw 21 and the positioning sensor or rotation sensing member of the encoder 99.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

The invention claimed is:

1. An electrically powered linear actuator comprising:
   a housing having a proximal end, a distal end and a longitudinal axis extending between said proximal and distal ends;
   an elongated screw shaft with external threads, said screw shaft being rotationally moveable relative to said housing, a thrust member having a portion with internal threads engageable with the external threads of said screw shaft, said thrust member being axially moveable relative to said housing;
   a motor in said housing, said motor having a rotor surrounding at least a portion of said thrust member, the rotor having a plurality of magnets mounted axially along a surface of the rotor; and
   a hub supported for rotation within said housing near said proximal end operably and indirectly connecting the rotor and the screw shaft, such that the rotor and the screw shaft rotate with one another, the screw shaft extending through the hub.

2. The actuator of claim 1, wherein the thrust member is rotationally fixed.

3. The actuator of claim 2, wherein the thrust member comprises a pair of diametrically opposed flat portions.

4. The actuator of claim 3, further comprising a guide bushing having inner flat surfaces engageable with the diametrically opposed flat portions of the thrust member such that the thrust member is rotationally fixed, but axially moveable, relative to said housing.

5. The actuator of claim 1, wherein the portion with internal threads comprises a nut operatively engaged with the screw shaft.

6. The actuator of claim 5, wherein the thrust member further includes a thrust tube.

7. The actuator of claim 1, further comprising a hub bearing positioned radially outward from the hub and supporting the hub relative to the housing.

8. The actuator of claim 1, wherein the hub includes a rim portion with a plurality of engagement notches and the housing includes an access opening to permit access to the notches for override.

9. The actuator of claim 1, wherein the rotor includes a proximal end connected with the hub and an unsupported distal free end.

10. The actuator of claim 1, further comprising a rotary encoder having a rotation sensing member rotatable with said rotor.

11. An electrically powered linear actuator comprising:
    a housing having a proximal end, a distal end and a longitudinal axis extending between said proximal and distal ends;
    an elongated screw shaft with external threads, said screw shaft being rotationally moveable relative to said housing, a thrust member having a portion with internal threads engageable with the external threads of said screw shaft, said thrust member being axially moveable relative to said housing;
    a motor in said housing, said motor having a rotor surrounding at least a portion of said thrust member, the rotor having a plurality of magnets mounted along a surface of the rotor; and
    a hub supported for rotation within said housing near said proximal end operably connecting the rotor and the screw shaft, such that the rotor and the screw shaft rotate with one another.

12. The actuator of claim 11, wherein the plurality of magnets are mounted axially along a surface of the rotor.

13. The actuator of claim 12, wherein the plurality of magnets are inlaid within channels of the outer surface of the rotor.

14. The actuator of claim 13, further comprising axially extending rib areas between the channels of the rotor to limit core saturation of the magnets.

15. The actuator of claim 11, wherein the rotor comprises a plurality of holes for reducing inertia of the rotor.

16. The actuator of claim 11, wherein the threads of the screw shaft comprise one of ACME threads, roller screw threads, or ball nut threads.

17. The actuator of claim 16, further comprising stationary motor windings positioned radially outward from the rotor.

18. The actuator of claim 11, further comprising a rotary encoder having a rotation sensing member rotatable with said rotor.

* * * * *